(12) United States Patent
Bienas et al.

(10) Patent No.: US 11,184,880 B2
(45) Date of Patent: Nov. 23, 2021

(54) ACK/NACK MESSAGING IN A SINGLE FREQUENCY NETWORK

(71) Applicant: IPCom GmbH & Co. KG, Pullach (DE)

(72) Inventors: Maik Bienas, Schoeppenstedt (DE); Andreas Schmidt, Braunschweig (DE); Martin Hans, Bad Salzdetfurth (DE); Achim Luft, Braunschweig (DE)

(73) Assignee: IPCOM GMBH & CO. KG, Pullach (DE)

( * ) Notice: Subject to any disclaimer, the term of this patent is extended or adjusted under 35 U.S.C. 154(b) by 686 days.

(21) Appl. No.: 15/777,557

(22) PCT Filed: Nov. 28, 2016

(86) PCT No.: PCT/EP2016/078997
§ 371 (c)(1),
(2) Date: May 18, 2018

(87) PCT Pub. No.: WO2017/093186
PCT Pub. Date: Jun. 8, 2017

(65) Prior Publication Data
US 2021/0084618 A1    Mar. 18, 2021

(30) Foreign Application Priority Data
Dec. 1, 2015    (EP) .................................... 15197274

(51) Int. Cl.
*H04W 72/04* (2009.01)
*H04L 1/18* (2006.01)

(52) U.S. Cl.
CPC ........... *H04W 72/04* (2013.01); *H04L 1/1812* (2013.01); *H04L 1/1861* (2013.01); *H04L 1/1864* (2013.01)

(58) Field of Classification Search
CPC .... H04W 72/04; H04L 1/1812; H04L 1/1861; H04L 1/1864
See application file for complete search history.

(56) References Cited

U.S. PATENT DOCUMENTS 10,135,596 B2 * 11/2018 Wang .................... H04L 1/1692
2002/0036122 A1    3/2002 Fayette et al.
(Continued)

FOREIGN PATENT DOCUMENTS

| EP | 1223703 | 7/2002 |
| EP | 1638362 A2 | 3/2006 |

(Continued)

OTHER PUBLICATIONS

International Search Report and Written Opinion for International Application No. PCT/EP2016/078997, dated Feb. 7, 2017.
(Continued)

*Primary Examiner* — Michael J Moore, Jr.
(74) *Attorney, Agent, or Firm* — Marshall, Gerstein & Borun LLP

(57) ABSTRACT

The invention provides a method of providing feedback from a plurality of base stations of a single frequency network to a user equipment device to indicate if a data transmission has been received successfully, wherein a positive acknowledgement of successful receipt is transmitted using a first feedback resource and a negative acknowledgement of unsuccessful receipt is transmitted using a second feedback resource, the first and second feedback resources being mutually orthogonal.

6 Claims, 2 Drawing Sheets

(56) References Cited

U.S. PATENT DOCUMENTS

| | | | |
|---|---|---|---|
| 2003/0152031 A1* | 8/2003 | Toskala | H04L 1/1819 370/236 |
| 2005/0180328 A1 | 8/2005 | Kim et al. | |
| 2007/0183451 A1* | 8/2007 | Lohr | H04L 1/1678 370/473 |
| 2009/0274109 A1* | 11/2009 | Zhang | H04L 5/0055 370/329 |
| 2010/0272004 A1* | 10/2010 | Maeda | H04W 72/0466 370/312 |
| 2011/0149774 A1* | 6/2011 | Chen | H04L 1/1887 370/252 |
| 2011/0216732 A1* | 9/2011 | Maeda | H04W 8/02 370/329 |
| 2012/0026935 A1 | 2/2012 | Park et al. | |
| 2014/0086173 A1* | 3/2014 | Sadeghi | H04L 5/003 370/329 |
| 2014/0348077 A1 | 11/2014 | Chen et al. | |
| 2015/0249972 A1* | 9/2015 | You | H04L 5/0035 370/254 |
| 2015/0350941 A1* | 12/2015 | You | H04W 84/045 370/252 |
| 2016/0353474 A1* | 12/2016 | Zhang | H04B 7/0626 |
| 2018/0323830 A1* | 11/2018 | Park | H04B 7/024 |

FOREIGN PATENT DOCUMENTS

| | | |
|---|---|---|
| EP | 2083530 A2 | 7/2009 |
| EP | 2 427 030 A1 | 3/2012 |
| JP | 2010-208814 A | 9/2010 |
| JP | 2010-539845 A | 12/2010 |
| JP | 2013-81193 A | 5/2013 |
| JP | 2015-218015 A | 12/2015 |
| WO | WO-2009/023730 A2 | 2/2009 |
| WO | WO-2009/045011 A1 | 4/2009 |
| WO | WO-2010084901 | 7/2010 |
| WO | WO-2010/125738 A1 | 11/2010 |
| WO | WO-201498483 | 6/2014 |

OTHER PUBLICATIONS

Indonesia Patent Application No. PID201804632, Office Action, dated Oct. 9, 2020.

Japan Patent Application No. 2018-522720, Notice of Reasons for Refusal, dated Dec. 21, 2020.

* cited by examiner

ACK/NACK MESSAGING IN A SINGLE FREQUENCY NETWORK

CROSS-REFERENCE TO RELATED APPLICATIONS

This is the United States national phase of International Patent Application No. PCT/EP2016/078997, filed Nov. 28, 2016, which claims the priority benefit of European Application No. 15197274.2 filed on Dec. 1, 2015. The entire contents of each of the foregoing are incorporated herein by reference.

FIELD OF THE DISCLOSURE

The present invention relates to single frequency networks in which a user equipment device receives simultaneous transmissions from a plurality of base stations, the transmissions from the base stations using the same radio resources.

The plurality of base stations make up a single frequency network and therefore appear as one single cell to the mobile devices. In addition, base stations can be added to and removed from the set of base stations that are currently transmitting data to a specific mobile device (UE) according to the UE's movement to cover the area where the UE is expected to move next, i.e. with regard to transmission to a specific UE some cells are switched on and some are switched off according to UE's movement. If there is no need for a base station to transmit to any UE it may also be totally switched off (powered down).

In the context of this invention the term SFN may be understood as a set of synchronously operating base stations that typically cover an area of larger extension, but also as a sub set of base stations from this larger set (so-called SFN Clusters). In order to avoid interference between neighbouring SFN Clusters, resources being used in the respective SFN Clusters may be orthogonal to each other.

The present invention concerns enabling backward error control for connections towards multiple base stations in an uplink (UL) direction (Mobile device to base stations) by applying Automatic Repeat Requests (ARQ) in the uplink. Based on feedback information re-transmissions of unsuccessfully received packets are requested. Therefore the reception of each packet is acknowledged (positive by transmission of an ACK or negative with NACK) by the receiving base station.

BACKGROUND

The use of ARQs and the transmission of ACK and NACK messages is well known. Examples may be found in documents such as US 2014/0348077 A1, EP 2 083 530 A2, WO 2014/98483 and WO 2010/084901.

EP 1 223 703 A1 proposes a method for ACK/NACK transmission in a broadcast/multicast system in which multiple receivers send rx-quality feedback to the transmitter on the same resources (time, frequency and codes) whereby the originators of the feedback are identified by codes or special multi-antenna techniques. Identification may not be necessary for all deployments of the method, but intentional overlapping feedback is not described.

The known techniques for transmission of feedback by multiple transmitters to a single receiver are lacking ability that simultaneously transmitted ACKs or NACKs by different transmitters appears as one ACK or NACK and the ability that simultaneously transmitted ACKs (or NACKs) by different transmitters leads to increased reception quality at the receiver and are therefore not able to deliver feedback from multiple base stations to a single UE.

The features described above are required because of the nature of the HARQ mechanism as used in 3G and 4G communication systems. The mechanism requires a timely feedback from the receiver to the transmitter in order to prevent the transmission to be stalled. There is not enough time for receivers (base stations) to coordinate themselves to send a single feedback (ACK or NACK). Thus, an immediate feedback has to be generated by each base station and different reception quality will lead to different feedback (ACK or NACK).

US 2005/0180328 A1 describes an ACK/NACK transmission algorithm for multiple base stations. Part of the algorithm indicates that a UE determines an ACK/NACK status for each base station indicating that messages from different base stations do not use the same radio resources and may be individually decoded. US 2003/0152031 describes a similar system where a UE is able to determine a number of ACKs and NACKs received, again indicating that different base stations do not transmit using the same resources. In a WCDMA system, it would be expected that each base station would transmit messages using a scrambling code specific to that base station.

EP 1 638 362 A2 also describes a system in which multiple base stations may send an ACK or a NACK. As with the previous two documents each base station would use mutually different radio resources for its ACK/NACK messages, allowing them to be individually decoded. US 2012/0026935 A1 describes ACK/NACK messaging in an LTE system including a relay node. A specific channel is allocated to transmissions from the relay node such that the eNB and the relay node use different radio resources.

GENERAL DESCRIPTION

The present invention provides a method of providing feedback from a plurality of base stations of a single frequency network to a user equipment device to indicate if a data transmission has been received successfully, wherein the base stations each transmit in the event of a successful receipt of the data transmission a positive acknowledgement using a first feedback resource and in the event of an unsuccessful receipt of the data transmission transmit a negative acknowledgement using a second feedback resource, the first and second feedback resources being mutually orthogonal, the first and second feedback resources being common to the plurality of base stations.

In a further aspect, the invention provides a user equipment device adapted to operate in a single frequency network, wherein the device is arranged to transmit data to base stations in the single frequency network and to receive simultaneously feedback messages from the base stations indicating whether the data have been successfully received such that the device may receive simultaneously both positive and negative acknowledgement feedback messages, the positive feedback messages being transmitted using a common first radio resource and the negative acknowledgement messages being transmitted using a common second radio resource, orthogonal to the first, and wherein the device is arranged to analyse received feedback messages for a positive acknowledgement of successful receipt and only if no such positive acknowledgement feedback message is received to analyse the received feedback messages to determine whether a negative acknowledgement of receipt has been received.

The UE is enabled to receive ACKs or NACKs from multiple base stations related to UE's latest uplink transmission, while all ACKs and all NACKs are received as a single overlaid signal with increased reception quality. The following are included:

Preferably, simultaneously transmitted ACKs by different transmitters appears as one ACK due to the synchronous transmission scheme while any NACKs transmitted are also identified. This is beneficial, as it safes resources due to the multiple use of identical resources.

Simultaneously transmitted ACKs by different transmitters may lead to increased reception quality at the receiver, also due to the synchronous transmission. This is beneficial, as it increases the reliability of the transmission.

Blank transmissions may be avoided, i.e. it is avoided that TX-Power of ACK resource is zero when a certain base station transmits NACK. This is advantageous as it reduces the Peak-to-Average-Ratio (PAR) of the transmitted signal, which will allow the usage of cheaper power amplifiers. This is achieved by the following means:

A special code for "Null transmission" may be used in case that different time-frequency resources are defined for NACK and for ACK transmission. This special code is transmitted on the resource reserved for the command not used (e.g. on the NACK resource if ACK is transmitted).

Different codes for ACK and NACK may be used on the same time-frequency-resource. As each base station will either transmit ACK or NACK, a Null-Transmission is avoided.

BRIEF DESCRIPTION OF THE DRAWINGS

Embodiments of the invention will now be described, by way of example only, with reference to the accompanying drawings in which.

DETAILED DESCRIPTION

Figure 1:
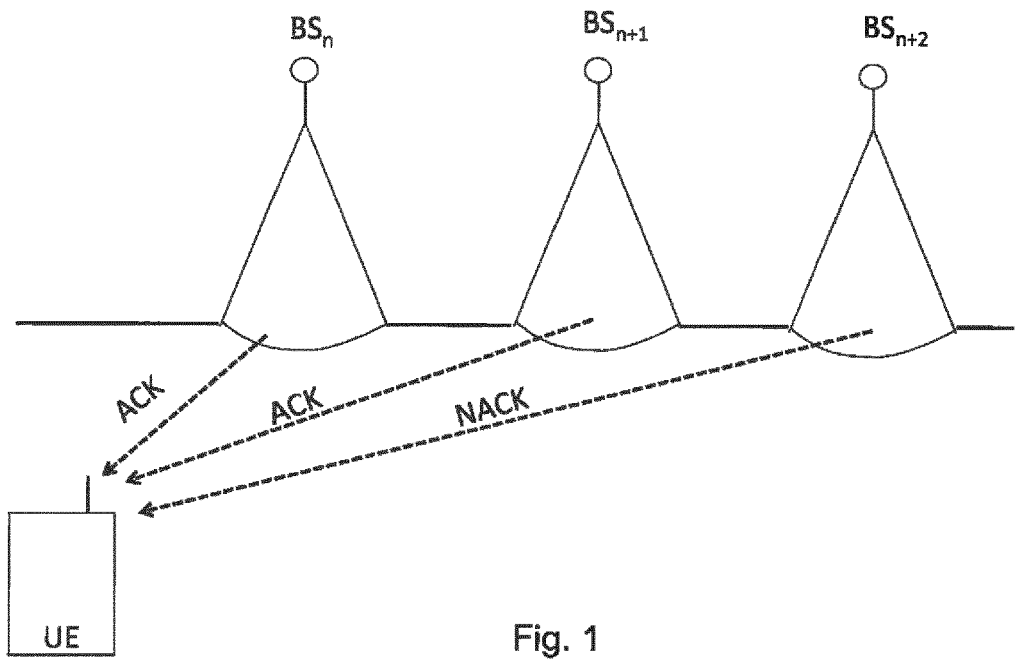
FIG. 1 is a schematic diagram of a single frequency network.

Referring to FIG. 1, in a first embodiment three base stations $BS_n$, $BS_{n+1}$ and $BS_{n+2}$ are configured to serve as a Single Frequency Network for a UE, i.e. the base stations simultaneously transmit data to the UE and simultaneously receive data from the UE. For the UE the overlapping signals from the base stations effectively appear as stemming from one single cell.

An Automatic Repeat Request (ARQ) procedure is applied in the Uplink. Each base station involved transmits individual feedback for received uplink packets to the transmitting UE.

The object of the invention is that a single transmitted ACK should be reliably detected even if several NACKs are simultaneously transmitted. This is important to avoid unnecessary re-transmissions. It is also preferable that a reliable detection that no ACK is transmitted corresponding to a particular transmitted packet is provided. This is important in order to ensure a necessary re-transmission is not missed.

The ARQ procedure provides for these requirements looks as follows.

A first feedback resource (ACK resource) is used by all base stations for transmission of an ACK and a second resource (NACK resource), orthogonal to the ACK resource, for transmission of a NACK. This enables, that ACKs and NACKs that are transmitted by different base stations will not interfere each other. In addition the synchronous parallel transmission of multiple ACKs or NACKs by respective multiple base stations will increase the reception quality. A resource is a combination of a certain frequency range, time instance and code.

Figure 2:
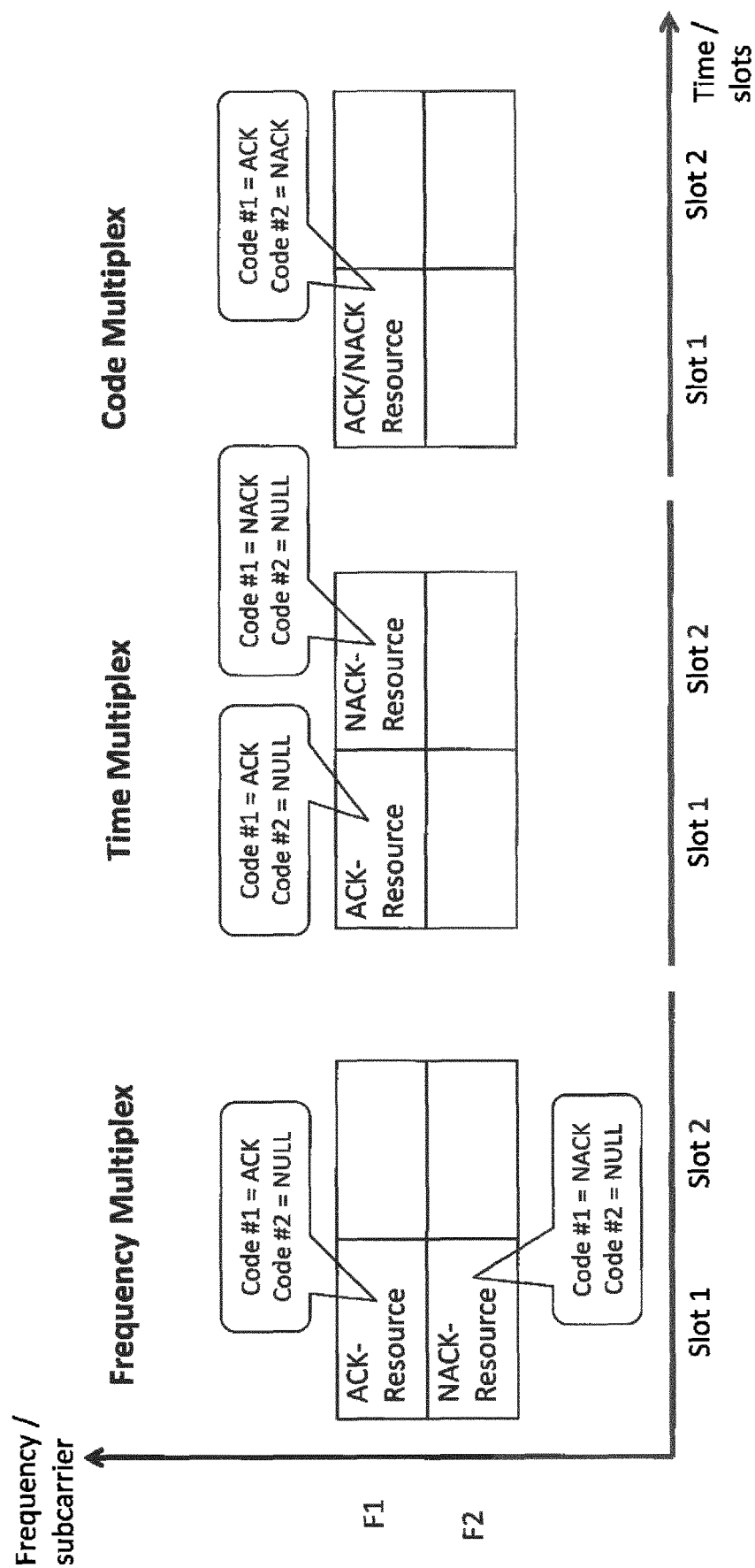
FIG. 2 shows acknowledgement resources for three possible multiplexing schemes.

Referring to FIG. 2 there is shown possible orthogonal feedback resources for three different multiplexing techniques, frequency multiplexing, time multiplexing and code multiplexing.

For frequency multiplexing, different frequencies (or subcarriers) are used for ACK and NACK, but the used code and timeslot could be identical. To avoid null-transmission, a null-code that is orthogonal to the code used for ACK/NACK is transmitted on the resource not used.

For time multiplexing, different timeslots are used for ACK and NACK, but the code used and the subcarrier could be identical. To avoid null-transmission, a null-code is transmitted on the not used resource.

For code multiplexing, different codes are used for ACK and NACK. The used subcarrier and timeslots could be identical. A null-code is not needed, as either ACK or NACK are transmitted and therefore a null-transmission cannot occur. This is the preferred embodiment, as it saves resources.

So called "Walsh Codes" are used to code the feedback information. For an ACK, the code "1 1" is used whereas for a NACK, the code "1 −1" is used.

A length of two for the codes is a minimum required to distinguish the two different types of feedback information. The reliability in distinguishing the feedback information under difficult circumstances (e.g. high number of feedback sending base stations, high path loss, unequal reception power) is increased on the cost of larger amount of required resources if the code length is increased. For a more reliable coding of feedback information, for an ACK, the code "1 1 1 1 1 1 1 1" could be used and for a NACK "1 −1 1 −1 1 −1 1 −1".

Figure 3:
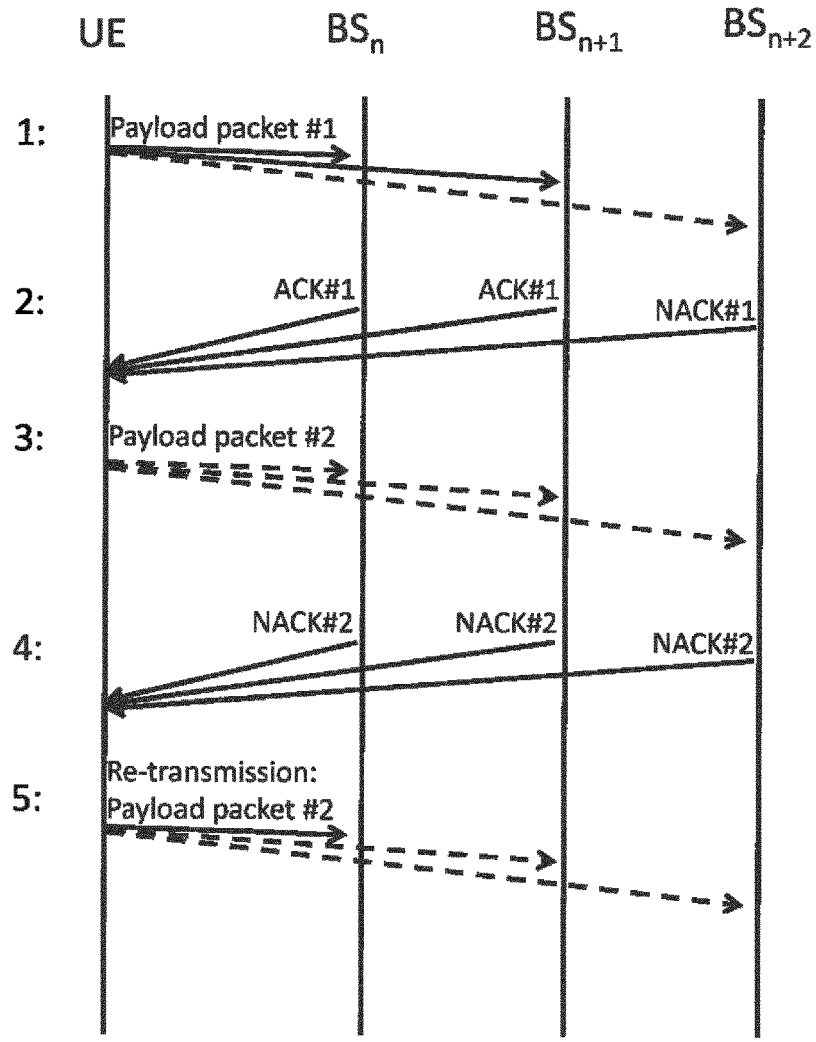
FIG. 3 shows a message sequence chart.

Referring to FIG. 3, there is shown a message flow chart showing messages exchanged between the UE and the three base stations of FIG. 1.

In a first phase, the UE transmits a first payload packet. This is correctly received by $BS_n$ and $BS_{n+1}$ (indicated by solid lines in FIG. 3), but incorrectly by $BS_{n+2}$ (dotted line). In phase 2, $BS_n$ and $BS_{n+1}$ transmit a positive feedback i.e. an ACK, back to the UE. $BS_{n+2}$ transmits a NACK, due to the incorrect reception. Code multiplexing is used to distinguish ACKs and NACKs, i.e. all BSs will use the same time slot and same subcarrier for transmission of the feedback information, and individual codes for ACK and NACK. In this example ACK is transmitted as "1 1" while NACK is transmitted as "1 −1". The transmit power is equal for all involved BSs (e.g. configured at connection setup). This means, that the received signal power of a closer BS is higher than that of a far away BS. This property is advantageous, as this ensures that ACK reception is more reliable than NACK reception. Once the feedback is transmitted, a single overlaid feedback signal is received by the UE. The UE decodes the signal by correlation with the ACK code. This is done firstly, as by detection of an ACK the detection procedure is left and the transmission of the next payload packet will start. In this example it detects that the correlation peak of the ACK code is clearly above the noise level, i.e. an ACK is detected. This indicates that packet #1 was received correctly (at least by one BS) and the UE will proceed with transmission of the next payload packet. Since at least one ACK was transmitted, it is of no interest to the UE that one or more base stations did not correctly receive the first payload packet.

In phase 3, the UE transmits payload packet #2. Due to the fact, that the reception status is different for the involved base stations, without further means the BSs are not aware whether the next packet is a re-transmission or a new packet. Therefore the UE includes in each packet the required information according to the used ARQ method. The message includes coding indicating "new data indicator" in new packets and coding indicating "redundancy version" in re-transmissions.

As shown in phase 4, payload packet #2 is not correctly received by all base stations $BS_n$ to $BS_{n+2}$ and therefore all base stations transmit a NACK by using code "1 -1" to the UE. The UE calculates the correlation peaks for ACK, and detects that the peak is very low. It is not significantly higher than the noise level. This is the first indication, that no ACK was received. In a following detection step, the UE calculates the correlation peaks for NACK. It is clearly above the noise level, i.e. an NACK is detected. This is the second indication, that no ACK was received.

Based on the two indications found in the previous step, the UE decides to re-transmit payload packet #2 with increased power and/or with a more robust modulation and coding. This re-transmission is correctly received by $BS_n$.

For the case, that neither ACK nor NACK are detected by the UE, a re-transmission is attempted. If too many of these re-transmission attempts are not successful (no ACK is detected), the UE will enter the "Radio Link Failure" state. I.e. it tries to re-connect to the latest known cell or tries to find another suitable cell (or SFN-Cluster).

The procedure described above is to enable feedback to a single UE. If multiple UEs having a SFN Uplink connection, multiple feedback resources are required. The additional resources are enabled by the well known multiplexing techniques (time, frequency- or code-multiplex). It is preferred to use code-multiplex. Therefore the length of the used codes must be at least twice the number of UEs with active SFN-Uplink. Using longer codes will additionally increase the detection reliability against noise. E.g. eight UEs could simultaneously obtain feedback with the following codes of length 16 as shown in the following table.

| Feedback Information [UE #] | Code |
|---|---|
| ACK [UE1]: | 1 1 1 1 1 1 1 1 1 1 1 1 1 1 1 1 |
| NACK [UE1]: | 1 -1 1 -1 1 -1 1 -1 1 -1 1 -1 1 -1 1 -1 |
| ACK [UE2]: | 1 1 -1 -1 -1 -1 1 1 1 1 -1 -1 -1 -1 1 1 |
| NACK [UE2]: | 1 -1 -1 1 -1 1 1 -1 1 -1 -1 1 -1 1 1 -1 |
| ACK [UE3]: | 1 1 1 1 -1 -1 -1 -1 1 1 1 1 -1 -1 -1 -1 |
| NACK [UE3]: | 1 -1 1 -1 1 -1 1 -1 -1 1 -1 1 -1 1 -1 1 |
| ACK [UE4]: | 1 1 -1 -1 -1 -1 1 1 1 1 -1 -1 -1 -1 1 1 |
| NACK [UE4]: | 1 -1 -1 1 -1 1 1 -1 1 -1 -1 1 -1 1 1 -1 |
| ACK [UE5]: | 1 1 1 1 1 1 1 1 -1 -1 -1 -1 -1 -1 -1 -1 |
| NACK [UE5]: | 1 -1 1 -1 1 -1 1 -1 -1 1 -1 1 -1 1 -1 1 |
| ACK [UE6]: | 1 1 -1 -1 -1 -1 1 1 -1 -1 1 1 1 1 -1 -1 |
| NACK [UE6]: | 1 -1 -1 1 -1 1 1 -1 -1 1 1 -1 1 -1 -1 1 |
| ACK [UE7]: | 1 1 1 1 -1 -1 -1 -1 -1 -1 -1 -1 1 1 1 1 |
| NACK [UE7]: | 1 -1 1 -1 -1 1 -1 1 -1 1 -1 1 1 -1 1 -1 |
| ACK [UE8]: | 1 1 -1 -1 -1 1 1 -1 -1 1 1 1 1 -1 -1 |
| NACK [UE8]: | 1 -1 -1 1 -1 1 1 -1 -1 1 1 -1 1 -1 -1 1 |

The procedure as described above requires transmission of either ACK or NACK. As an alternative, the following procedure only requires transmission of ACK (in case the payload packet was received correctly). Otherwise if the packet was not received correctly, no feedback will be transmitted.

The received feedback signal may consist of one or several overlaid ACKs or of a blank transmission if no base station has received the payload packet correctly.

The UE will try to detect an ACK in the feedback signal. In case of success, i.e. if the decoded signal is clearly above the noise level, the UE will proceed with sending the next payload packet. If the decoded signal is not clearly above the noise level, the UE interprets this as NACK. It will then re-transmit the latest payload packet.

This alternative embodiment is advantageous, as it saves resources. Only ACK resources are required. Therefore codes of length 8 are sufficient to enable feedback channels for eight UEs. On the other hand the blank transmission may require power amplifiers that can handle signals with higher PAR.

The invention claimed is:

1. A method of providing feedback from a plurality of base stations of a single frequency network to a user equipment device to indicate if a data transmission has been received successfully, wherein the base stations each transmit in the event of a successful receipt of the data transmission a positive acknowledgement using a first feedback resource and in the event of an unsuccessful receipt of the data transmission transmit a negative acknowledgement using a second feedback resource, the first and second feedback resources being mutually orthogonal, the first and second feedback resources being common to the plurality of base stations.

2. The method of claim 1 wherein the first and second feedback resources are orthogonal code sequences.

3. The method of claim 2 wherein the code sequences each have a bit length equal to at least twice a number of user equipment devices transmitting data in the single frequency network.

4. The method of claim 1 wherein the first and second feedback resources are different time or frequency resources.

5. The method of claim 4, wherein a null transmission is transmitted by a base station in the feedback resource not used to transmit a feedback message.

6. A user equipment device adapted to operate in a single frequency network, wherein the device is arranged to transmit data to base stations in the single frequency network and to receive simultaneously feedback messages from the base stations indicating whether the data have been successfully received such that the device may receive simultaneously both positive and negative acknowledgement feedback messages, the positive feedback messages being transmitted using a common first radio resource and the negative acknowledgement messages being transmitted using a common second radio resource, orthogonal to the first, and wherein the device is arranged to analyse received feedback messages for a positive acknowledgement of successful receipt and only if no such positive acknowledgement feedback message is received to analyse the received feedback messages to determine whether a negative acknowledgement of receipt has been received.

* * * * *